INVENTOR.

Megerditch V. Kalfaian

INVENTOR
Mynn V. Kalfaian

INVENTOR

Mgen V. Kalfaian

INVENTOR
Megan V. Kalfaian

INVENTOR.

Megan V. Kalfaian

United States Patent Office 3,431,359

Patented Mar. 4, 1969

3,431,359

AMPLITUDE EQUALIZER OF SPEECH SOUND WAVES WITH HIGH FIDELITY

Meguer V. Kalfaian, 962 Hyperion Ave., Los Angeles, Calif. 90029

Filed Sept. 17, 1965, Ser. No. 488,076

U.S. Cl. 179—1 8 Claims

Int. Cl. H04m *1/00*; H03g *3/20*; H03f *1/30*

ABSTRACT OF THE DISCLOSURE

In an amplifying system for equalizing the amplitudes variations of major amplitude peaks of complex waves, in which said variations change exponentially; pulse signals are first derived from the major peaks of said waves; the said waves are first time delayed and amplified through a gain controllable amplifier; the said waves are unidirectionally detected and charged across a plurality of large capacitors by a ring distributor under control of said pulse signals; and said charges are transferred to a smaller capacitor in delayed and coincidental time periods with respect to the delayed and amplified waves, in series with respective resistors of controlled ohmic values, so that the transferred charges across the smaller capacitor controls the gain of the said amplifier with exponential variations in opposition to the original variations, for attaining non-distorted amplitude equilization.

Figure 1:
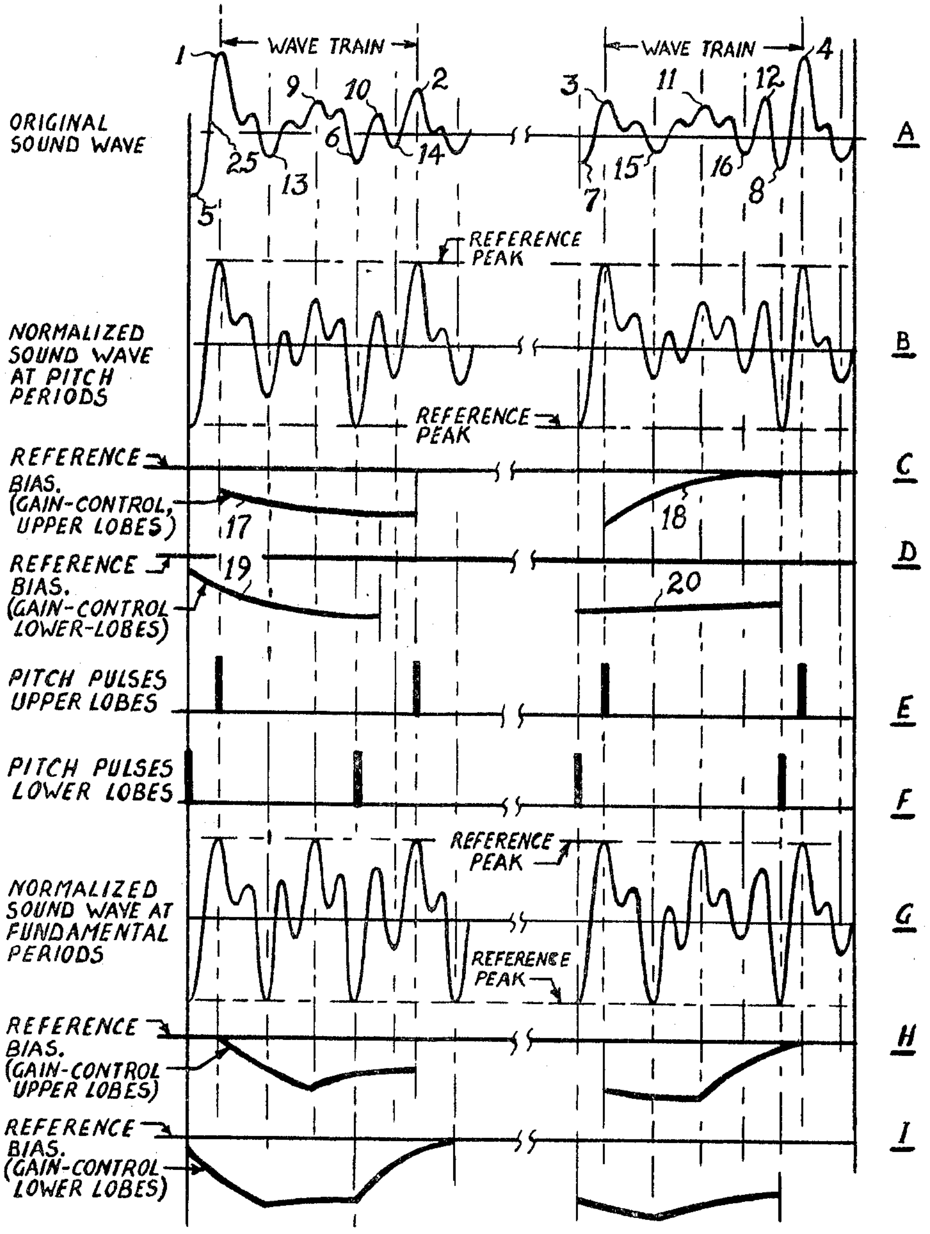

This invention relates to automatic amplitude control systems, and more particularly to a system for normalizing the amplitude variations of propagated speech sound waves to a constant-peak amplitude level. Its main object is to vary the gain of a gain-controllable amplifier from a normal minimum gain towards a maximum gain, whereby avoiding background noise amplification at high gain that is usually associated with conventional gain-controllable amplifiers using maximum to minimum normalization. A further object is to equalize the peak amplitude of the sound waves stepwise at fast changing steps, so as to maintain said constant level with fast amplitude changes of the sound waves. And a corollary object is to normalize said amplitude variations without any wave distortion, or any wave clipping, whereby maintaining high fidelity of the original sound quality, with highly increased intelligibility of the speech.

In various forms of speech sound wave production and reproduction, it is often desirable that the wide variations in amplitude of the sound waves are compressed and expanded to a constant amplitude level. In one example, such amplitude equalization is desirable for transmitting speech sound waves through radio or wire links where the signal-to-noise ratio is very low. In such noisy transmission, the phonetic sound "a" may be received intelligibly, because of its inherent high amplitude characteristics, but the phonetic sounds, such as, "t," "k," "s," may be completely lost in noise, because of their inherent low amplitudes. Thus it is desirable that the amplitude level of the sound is kept constant above noise level, so as to convey speech intelligibly in all of its phonetic sounds. Such amplitude equilization is also desirable for speech analysis and recognition, and also analyzing complex waves that contain trains of waves, for example, echo waves for target classification.

In conventional practice of amplitude equalization, the gain of an amplifier is reduced by negative feedback through a resistance-capacitance network. In this case, when the time constant of this network is adjusted to be substantially long, distortion of the original waveform is negligible, and substantial fidelity of the original quality of the voice is maintained; but complete equalization is not obtained. Whereas, when the time constant of this network is adjusted to be too short, for example, wave train to wave train, the original waveform of each wave train of the sound is distorted, with consequential impairment of the voice quality. Two types of distortions are effected: the first is a peak clipping; and the second is destruction of the original amplitude ratios of the minor waves in a wave train one with respect to another. The first type of distortion adds unpleasant noise to the voice; besides changing the original quality characteristics of the voice. The second type just changes the quality characteristics of the voice, and the intelligibility still remains high. A third undesired effect that is usually present in previously proposed amplitude equalization devices, is the normal high gain adjustment of the amplifier, which causes the normal incoming noise amplified at high sound level. Accordingly, the principal object of the present invention is to provide amplitude equalization from a normal minimum gain adjustment to a maximum gain of the amplifier, and provide fast gain adjustment without wave distortion, so as to maintain complete amplitude equalization with top quality of voice reproduction.

Figure 2:
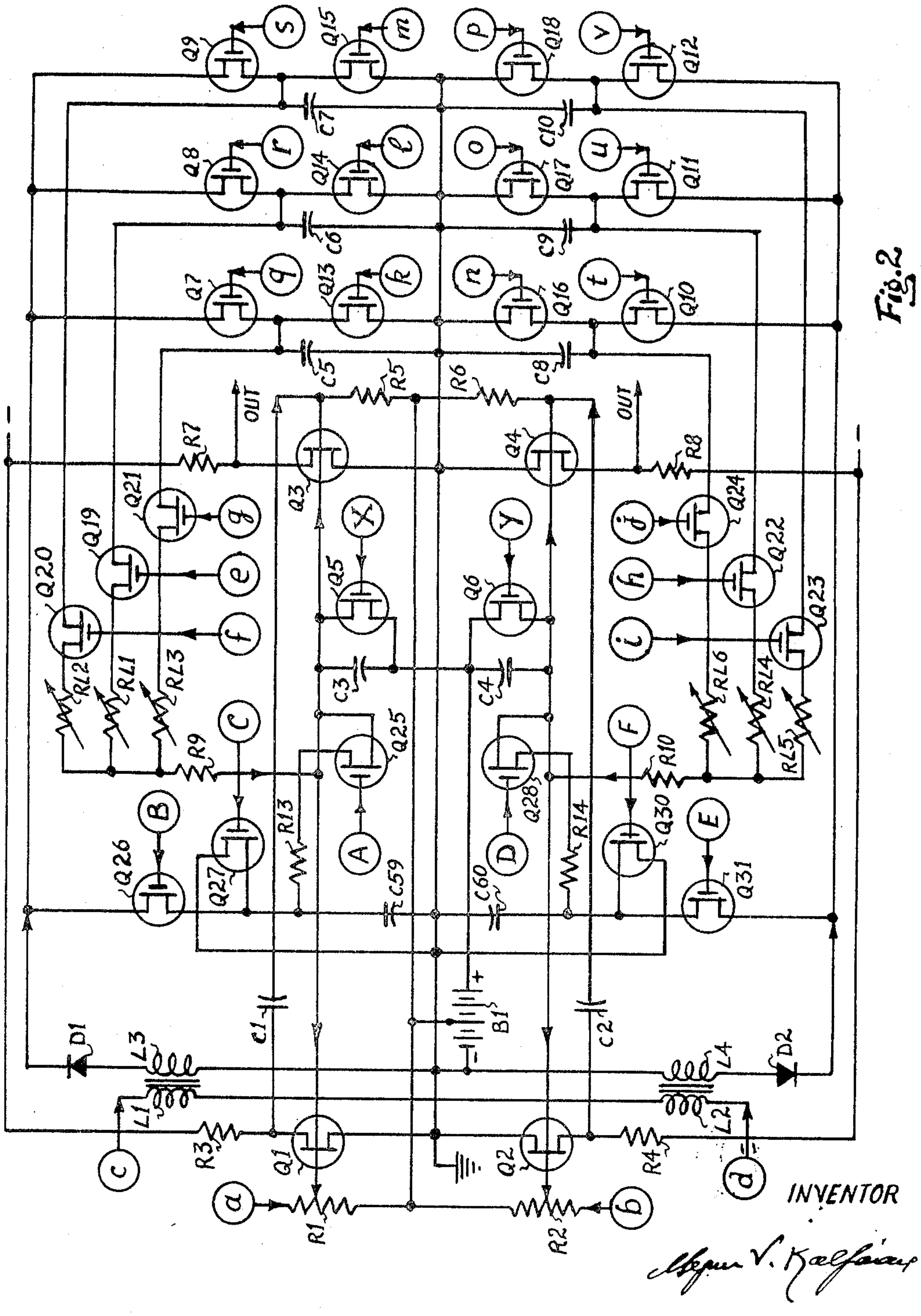
Figure 3:
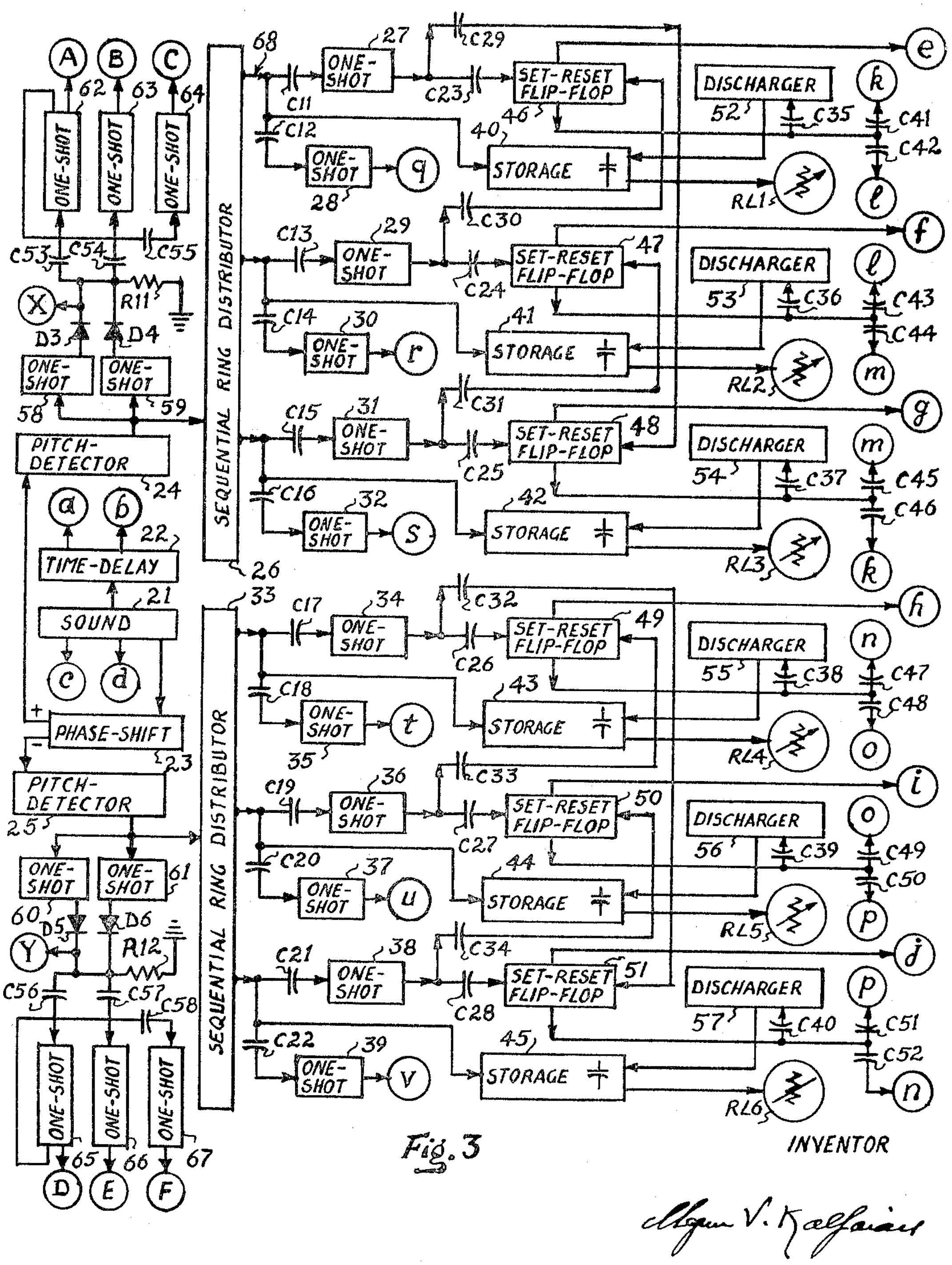
Figure 4:
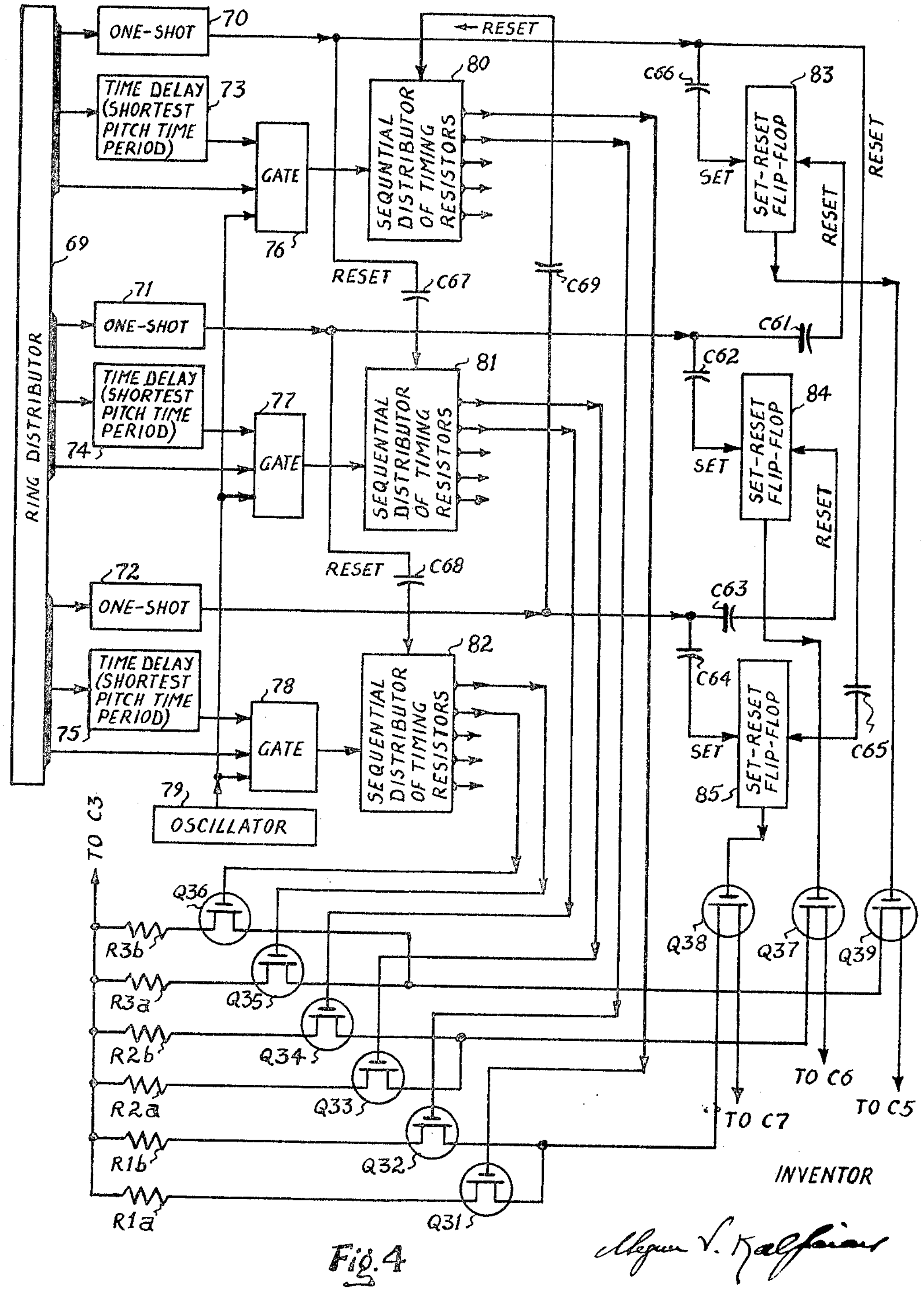
Figure 5:
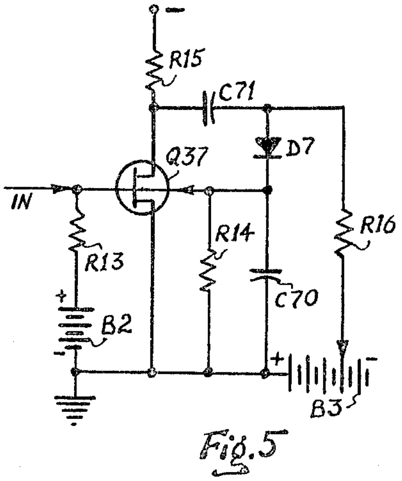

In order to achieve the ideal results, as mentioned above, it is first necessary to analyze the true structure of these amplitude variations, so that the reverse process may be applied for said equalization. For example, in a voiced vowel sound, there are produced trains of waves, which are set into vibrations in the momentarily formed resonant cavities of the vocal system, by puffs of air through the glottis. As each puff of air enters these cavities, an initial surge of pressure is formed, and accordingly, these vibrations are commenced by a high peaked wave representing the major peak of said wave train. Due to the initial strength of this puff of air, the amplitudes of the succeeding wave vibrations (fundamental waves within wave trains) diminish exponentially, until a succeeding puff of air creates another minor peaked waves, and so on. In normal speech, however, the strength of these puffs of air also varies, and consequently, the peak amplitudes of these wave trains vary enormously. This exponential diminishing of the waves after each initiation of said major peaks is true for all sounds, for example, the plosive and hissing sounds. Thus, if the peaks of said major peaks of the propagated sound waves were shifted to a reference peak level in exponentially varying steps from major peak to major peak, the original quality of the voice could be maintained at high fidelity, with enormously increased amount of intelligibility. With such performance, when the amplifier gain is increased to said reference peak amplitude from a normal minimum gain, then the ideal amplitude equalization is realized. It is the specific object of this invention, accordingly, to provide methods and means for the accomplishment of said ideal performance, a detailed specification of which will now be given in connection with the accompanying drawings, wherein:

FIG. 1 is a graphical illustration of waveforms involved in describing the basic principles of the invention; FIG. 2 is a schematic arrangement of the amplitude equalizer, in accordance with the invention; FIG. 3 is a block diagram of a section incorporated with the schematic arrangement of FIG. 2; FIG. 4 is a modified arrangement of the block diagram in FIG. 3, in accordance with the invention; and FIG. 5 is a schematic arrangement of a major peak detector from the speech sound waves.

Referring to the Illustration in FIG. 1, there are shown two trains of the sound waves at A, the left handed wave diminishing in amplitude, and the right handed wave increasing in amplitude. The major peaks of these wave trains are designated by the numerals 1 through 4 in the upper lobes, and the major peaks in the lower lobes are designated by the numerals 5 through 8. It will be noted that the major peak 6 in the first wave train is shifted one complete cycle towards the right handed side, as indicated by the numeral 8. This shifting, however, is a characteristic performance of the major peak (pitch) detector that was used for peak selection. While such errors will not affect the overall performance of peak amplitude equalization, other types of pitch detectors are also known for more accuracy, and may be used depending on preference. The selected major peaks from the sound waves at A are shown by the pulses at E and F. The amplitude equalized waves are shown at B, which illustrates how the wave peaks at said major peaks, both in the upper and lower lobes, are equalized to the reference peaks. The exponential curves 17 and 18 at C show how the upper lobes of the waves at A are equalized, and the curves 19 and 20 at D show how the lower lobes of these waves are equalized.

As described in the foregoing, when the amplitude equalized waves at B are shaped properly without introducing wave distortion, or clipping, high quality of the original voice can be preserved. I have also shown in my previous disclosures, for example, in my copending patent application Ser. No. 452,737, filed May 3, 1965, entitled "Speech Sound Wave Analysis," that the fundamental peaks (submajor peaks within major peaks) 9 through 12 in the upper lobes, and 13 through 16 in the lower lobes of the waves at A, may also be amplitude equalized, as shown by the waves at G, without loss of intelligibility. In an actual experiment I have shown this to be true, but the quality value of the voice has been impaired, although still being pleasant to the listener. The gain controlling waveforms at these fundamental peaks within pitch intervals are shown in the drawing at H and I. The control pulses at fundamental peaks had been derived from the same pitch detecting device, by readjusting the resolution time constant of the resistance-capacitance network used, as will be described further by the arrangement given in FIG. 5. Thus, while the present disclosure will particularly be directed to the amplitude equalization of speech sound waves stepwise in pitch periods, or wave trains, the terms used both in the specification, and the claims appended thereto, will be assumed only for the purpose of description, and not specifically to pitch or fundamental time periods.

With the above given broad description, reference will now be made to the schematic arrangement, as shown in FIG. 2, in conjunction with the block arrangement, as shown in FIG. 3, because each one of these arrangements constitutes a part of the complete working system. For this reason, the intercoupled terminals are designated by italic letters in circles, each pair of identical letters representing a direct connection therebetween. The original sound wave in block 21 is applied to a time delay circuit in block 22, which allows sufficient time for deriving control signals from the original sound wave, prior to emanation from the output terminals *a* and *b*. The sound wave in block 21 is also applied to a phase shifting network in block 23, which advances the phase angle of the applied sound waves to about 90 degrees. The time delayed sound waves at output terminals *a* and *b* of the block 22 are applied to the first gate electrodes of tetrode field-effect transistors Q1 and Q2, from terminals *a* and *b* across load resistors R1 and R2, respectively, which return to ground in series with a normal backward bias, as tapped across biasing source B1. These applied sound waves are amplified across resistors R3 and R4 in the drain circuits of Q1 and Q2, respectively, and further applied to the first gate electrodes of tetrode field-effect transistors Q3 and Q4, through coupling capacitors C1 and C2, and across load resistors R5 and R6, respectively, which also return to ground in series with said tap across the potential of B1. The amplified sound waves across resistors R7 and R8 in the drain circuits of Q3 and Q4 are either applied to another stage of amplitude equalizing field-effect tetrode transistors, or, as an equalized output to an outgoing terminal. The number of stages utilized depends upon the limited $G_m$ curve of tetrode transistors in which the sound wave can be modulated linearly without distortion.

The second gate-electrodes of the amplifier transistors Q1 through Q4 are utilized as the gain-controlling elements, and in each single ended side they are connected in parallel, for example, the second gate electrodes of Q1 and Q3 are connected in parallel, and the second gate electrodes of Q2 and Q4 are connected in parallel. The backward biasing source B1 is connected to the second gate electrodes of Q1 and Q3 in series with the capacitor C3, and this same biasing source is connected to the second gate electrodes of Q2 and Q4 in series with the capacitor C4. The capacitors C3 and C4 are normally short circuited by the normally conducting transistors Q5 and Q6, respectively. The potential of backward biasing source B1 is normally fixed to a magnitude for minimum gain of the amplifier comprising gain-controllable transisors Q1 through Q4, so that the incoming background noise in the absence of speech sound waves is held at a minimum. The capacitors C3 and C4 are also normally shunted by the conducting transistors Q5 and Q6, so as to prevent any drift charge of forward bias across them, due to inherently present leakage from gate to source electrodes of Q1 through Q4.

The phase shifted sound waves at output terminals *c* and *d* of the block 23 are applied to the *c* and *d* terminals of the primary coils L1 and L2 (these two coils are shown separately for drawing clarity, but actually they represent a single coil), which induce the applied sound waves inductively across the secondary coils L3 and L4, the junction terminals of which is connected to ground. The induced voltage across coil L3 is rectified by the diode D1, and applied to any one of the storage capacitors C5 through C7 in series with the normally off-state on-and-off transistors Q7 through Q9, for storage, while the induced voltage across coil L4 is rectified by the diode D2 and applied to any one of the storage capacitors C8 through C10 in series with the normally off-state on-and-off transistors Q10 through Q12, for storage, respectively. Across the storage capacitors C5 through C10 are connected in parallel discharging transistors Q13 through Q18, respectively, so that they may be rendered in on or off states for the holding of charges or discharges of last said capacitors. The stored voltages across capacitors C5 through C7 are connected to the capacitor C3 in series with any one of the normally off-state on-and-off transistors Q19 through Q21, and also in series with the variable resistive elements RL1 through RL3, in further series connected fixed resistor R9, respectively. Similarly, the store voltages across capacitors C8 through C10 are connected to the capacitor C4 in series with any one of the normally off-state on-and-off transistors Q22 through Q24, and also in series with the variable resistive elements RL4 through RL6, in further series connected fixed resistor R10, respectively. The capacitive values of capacitors C5 through C10 are prearranged in much larger values than the capacitive value of C3, so that the capacitor C3 may be charged to the stored potential of any one of the capacitors C5 through C10, in series with said switching transistors and said resistors, without appreciably affecting their original charges. The sequential time periods within which these capacitors and said on-and-off transistors are activated, are determined by the arrangement in FIG. 3, as follows:

The positive poled phase shifted sound waves in block 23 are applied to the pitch detector in block 24, and the negative poled phase shifted sound waves in block 23 are applied to the pitch selector in block 25, so that both the positive and negative major peaks of the sound waves are selected and changed into control pulses, separately. The output control pulses from pitch detector 24 are applied to the sequential ring distributor in block 26, which in turn applies sequential pulses, through couplings of the differentiating capacitors C11 to C16, to the one-shot circuits in blocks 27 and 28 in parallel; to the one-shot circuits in blocks 29 and 30 in parallel; and to the one-shot circuits in blocks 31 and 32 in parallel, respectively, for operation. Similarly, the output control pulses from pitch detector in block 25 are applied to the sequential ring distributor in block 33, which in turn applies sequential pulses, through couplings of the differentiating capacitors C17 to C22, to the one-shot circuits in blocks 34 and 35; to the one-shot circuits in blocks 36 and 37 in parallel; and to the one-shot circuits in blocks 38 and 39, respectively, for operation. Simultaneously, the distributor in block 26 applies sequential direct coupled signals to the time-versus-signal quantity storing devices in blocks 40 to 42, and the distributor in block 33 applies sequential direct coupled signals to the time-versus-signal quantity storing devices in blocks 43 to 45, respectively. Various forms of storage devices are known in the art of electronics, but in the instant disclosure it is assumed that these devices comprise capacitors connected to a fixed potential in series with on-and-off switches and timing resistors, so that whenever one of these switches operates in on-state the said capacitor charges at a charging rate depending upon the ohmic value of its series connected resistor. Thus, each one of these capacitors in the blocks 40 through 45 charges to a voltage during the time period of a wave train (major peak to major peak) of the sound waves, as controlled by the distributor, and this charged voltage represents the time period during which a wave train has occurred. Accordingly, as the distributors in blocks 26 and 33 operate sequentially, but independently, the storage capacitors in blocks 40 to 45 are charged to voltages representing the time periods of wave trains in the sound waves.

The operating time periods of the one-shot circuits in blocks 27, 29, 31, 34, 36 and 38 are preadjusted approximately equal to the delay time period of the delay circuit in blocks 22, so that their operating states will terminate at the same time that the major peaks of the sound waves at which said one-shots had started operation will emanate from the output terminals *a* and *b* of the time delay circuit in block 22, respectively. The sharp return to normal operating states of last said one-shot circuits will produce output pulses through the differentiating capacitors C23 through C28, which are applied in forward direction to the set-reset flip-flops in blocks 46 through 51, respectively, for operation in set positions. These same pulses (by way of couplings of the differentiating capacitors C29 through C34) are also applied to preceding ones of said set-reset flip-flops, for operation in reset operating positions, e.g., when the flip-flop in block 46 operates in set position, the flip-flop in block 48 operates in reset position; when the flip-flop in block 47 operates in set position, the flip-flop in block 46 operates in reset position, and so on. The set operating positions of these set-reset flip-flops will be designated hereinafter as the gain-controlling connections to the amplifier, by way of the energized output terminals *e* through *j*, respectively, and the reset operating position of these flip-flops, at said terminals, will be designated as disconnecting actions from the amplifier. For example, the output signals at terminals *e* through *j* of the set-reset flip-flops in blocks 46 through 51, are applied to the on-and-off transistors Q19 through Q24, respectively, for rendering them conductive sequentially, so as to effect the said slow charges of the capacitors C3 and C4 to any one of the charged capacitors C5 through C10, in series with the timing resistors R9 and R10, respectively, and in series with any one of the resistive elements RL1 through RL6 that may be connected thereto. The sharp transition states from set to reset positions of these set-reset flip-flops in blocks 46 to 51 are transformed into pulses by the differentiating capacitors C35 through C52, and the outputs of C35 through C40 are applied to the dischargers in blocks 52 through 57, respectively, which in turn discharge the stored charges across the capacitors in blocks 40 to 45, after their gain-controlling performances to the gain-controllable amplifier have terminated, for example, during the pulse applied to the discharger in block 52, it discharges the capacitor in block 40, and so on. These discharging pulses are also applied for simultaneous discharges (in steps with the blocks 40 to 45) of the gain-controlling stored charges across capacitors C5 through C10, by application of forward biases to the normally idle transistors Q13 through Q18 by ways of the like-terminations *k* through *p*, respectively, for repeat cycle of new charges. It will be noted that the output reset pulses of blocks 46 through 51 are applied in forward biasing directions simultaneously to pairs of the discharging transistors 313 through Q18, for example, through coupling capacitors C41 and C42 simultaneously to the transistors Q13 and Q14 by way of terminals *k* and *l*; through coupling capacitors C43 and C44 simultaneously to the transistors Q14 and Q15 by way of terminals *l* and *m*; etc., the reason for which will be described further.

Since the time-versus-signal quantity devices in blocks 40 through 45 are representatives of time periods, these time periods may also be represented by ohmic values, and therefore, in one form of application, the said stored electrical signal quantities in the blocks 40 through 45 are transformed into proportional ohmic values across controllable resistive elements RL1 through RL6, which for example, may be magnetically-varying resistive elements, or light-varying photoconductive elements, or the like, as available in the arts of electronics. Thus, the resistive elements RL1 through RL6 in FIG. 3, represent the same resistive elements as indicated by the like designations in FIG. 2, for controlling the charging time rates of the capacitors C3 and C4 to any one of the gain-varying stored voltages across capacitors C5 to C10, when connected thereto, further, the operating time periods of the one-shot circuits in blocks 28, 30, 32, 35, 37 and 39 are adjusted to pulse periods, and the outputs of their operating states are applied in forward directions to the on-and-off transistors Q7 through Q12, by way of the like-terminal connections *q* through *v*, for rendering them conductive sequentially, and thereby connecting the capacitors C5 through C10 to the coils L3 and L4 in series with the isolating diodes D1 and D2, for charging and storing in said capacitors the peak voltages across these coils, in respective order. The output pulses of pitch detector in block 24 are applied to the one-shot circuits in blocks 58, 59 for operation, and the operating output voltages of these one-shots are directly combined across the resistor R11 through isolating diodes D3 and D4. The operating time period of the one-shot in block 58 is pre-adjusted a little longer than the longest wave train period occurring in the sound waves, for example, 1/70 second for a bass voice, and the operating time period of the one-shot in block 59 is preadjusted a little shorter than last said period, so that during the varying time periods of said wave trains of the sound waves these two one-shots will hold a steady state backward bias upon the transistor Q5, by way of terminals *x*, and allow gain variation of the amplifier. Similarly the output pulses of pitch detector in block 25 are applied to the one-shot circuits in blocks 60, 61 for operation, and the operating output voltages of these one-shots are directly combined across the resistor R12 through isolating diodes D5 and D6. The operating time periods of these one-shots are preadjusted equal to the time periods of the one-shots in blocks 58 and 59, respectively, for the same reason that during the varying time periods of said wave trains of the sound waves the two one-shots 60 and 61 will hold a steady state backward bias upon the transistors Q6, by way of terminal *y*, and allow gain variations of the amplifier. When the sound waves subside below a threshold level, and the time duration after the last pitch-signals from the pitch detectors in blocks 24 and 25 takes longer than said 1/70 second, the one-shots 58 through 61 return to their normal operating states, and the transistors Q5, Q6 become conductive for shunting the capacitors C3 and C4, thereby reinstating the gain of the amplifier to its normal minimum gain.

The output voltage across resistor R11 is applied to the one-shots in blocks 62 and 63, through differentiating capacitors C53 and C54, respectively, and their outputs are further applied to the on-and-off transistors Q25 and Q26, respectively. At the initial incoming sound wave when the one-shot circuits in blocks 58 and 59 start operating, the sudden shift in voltage across R11 transmits forward pulses to the one-shots in blocks 62 and 63, through coupling capacitors C53 and C54, for operation. The operating time period of the one-shot 63 is preadjusted to a short pulse period, and it renders the transistor Q26 conductive, by way of the connecting terminals A and A. The conduction of Q26 completes a closed circuit through the secondary coil L3 to ground for charging the capacitor C59 to the peak voltage of the said initiating sound wave in series with the diode D1. The operating time period of the one-shot 62 is preadjusted equal to the time delay of the block 22, and during its operation it renders the transistor Q25 conductive, which in turn connects the charged capacitor C59 to the C3 in series with the timing resistor R13, so that by the time the said initial sound wave arrives at the terminal *a* of the amplifier Q1, the capacitor C3 has gradually assumed a gain controlling voltage for the initial arrival of the sound waves. The capacitor C3 could also be connected directly to the coil L3, but the sudden change in voltage will cause a displeasing pulse signal at the output across R3, although it may be of short duration. This is due to the reason that the transistor Q1 has a normal current passing to the output resistor R3. However, if a bridge circuit were utilized for the said gain control, which may be preferable, then any sudden change during absence of the sound signal will not cause objectionable noise. When the operation of the one-shot in block 62 terminates, it produces an output pulse through the differentiating capacitor C55 and applies to the one-shot in block 64 for operation. The operating time period of this one-shot 64 is preadjusted to a pulse period, during which time it renders the discharging transitsor Q27 conductive for discharging the C59. This operation is exactly similar to the pulse signal applied to the one-shot circuits in blocks 65 and 66 from across resistor R12 by way of the differentiating capacitors C56 and C57, in which case, the capacitor C60 is charged to the oppositely poled initial peak of the sound wave when the one-shot 66 operates, and renders the charging transistor Q31 conductive by way of the connecting terminals E and E. Similarly, the operation of the one-shot 65 renders the transistor Q28 conductive by way of the connecting terminals D and D, which in turn connects the capacitor C60 to the capacitor C4 in series with the timing resistor R14, for the said slow charging. When the one-shot 65 terminates its operation, it transmits a pulse signal to the one-shot 67 through the differentiating capacitor C58, and the one-shot 67 in turn renders Q30 conductive, by way of the terminals F and F, for the discharge of C60.

In operation, assume that the time-delayed sound waves at terminals *a* and *b* from block 22 are applied to the first gate electrodes of gain-controlling amplifier transistors Q1 and Q2, and are amplified across the drain circuit resistors R3 and R4 of Q1 and Q2, respectively. Assume also that pulse signals have started appearing at the outputs of pitch detectors in blocks 24 and 25, so that at least one of the one-shots 58 or 59, and one of the one-shots 60 or 61 are in operating states to render the shunting transistors Q5 and Q6 inoperative, thus allowing the capacitors C3 and C4 chargeable to applied voltages. With the exemplary time delay of 1/70 second in the block 22, and assuming that the pitch frequency of the initial sound waves in block 21 is 210 cycles per second, by the time the initial sound wave peaks arrive at terminals *a* and *b* there will be produced three pulses at the output of pitch selector in block 24, and three pulses at the output of pitch detector in block 25. The output pulses from block 24 are applied to the distributor in block 26 for control signal derivation, and the output pulses of pitch detector in block 25 are applied to the distributor in block 33 for control signal derviation. Since the operation of the distributor in block 33, and the operation of its associated parts, is exactly similar to the operation of the distributor in block 26, and the operation of its associated parts, it will suffice to make reference only to the operation of distributor 26 in conjunction with its associated parts, as in the following:

Assuming that the ring distributor 26 starts a sequence of operations with initial shift to the output terminal 68, the one-shots in blocks 27 and 28 start operation, and the capacitor in block 40 starts charging at a predetermined charging time rate, as described in the foregoing. The output pulse at terminal *q* of the one-shot in block 28 is applied in forward biasing direction to the transistor Q7, which becomes conductive and connects the capacitor C5 to the coil L3, through the rectifying diode D1, so that the capacitor C5 charges to the peak voltage of the sound wave. Because of this direct connection, the pulse length of the operating one-shot in block 28 does not have to be long for complete charge of the capacitor, and therefore, the said one-shot returns to its inactive state after some noncritical pulse time period, for example, after 1/1000 sec. operating duration. The capacitor C5 then becomes isolated, and holds it charged potential. When the following pulse from the pitch detector in block 24 re-energizes the distributor 26, the one-shots in blocks 29 and 30 assume operation, and the capacitor in block 41 starts charging in the previous manner. At the same time, the charging of the capacitor in block 40 stops, and it holds the assumed charge representative of the pitch time period. This charge is applied to the resistive element RL1, which in turn changes its ohmic value representative of the said pitch time period. With the operation of the one-shot in block 30, the transistor Q8 is rendered conductive, and the capacitor C6 is connected to the inductor L3 for charging to the peak of the sound wave during a similar pulse period. Lastly, when the distributor is acted upon again, the one-shots in the blocks 31 and 32 start operating, and the transistor Q9 is rendered conductive for connecting the capacitor C7 to the inductor L3 for charging to the peak voltage of the sound wave, while at the same time, the capacitor in block 41 stops charging, and the capacitor in block 42 starts charging. In a similar fashion, the stored charge of the capacitor in block 41 changes the ohmic value of the controllable resistive element RL2 by a representative value.

Starting from an initial application of the sound wave to the time delay circuit in block 22, and to the pitch detector in block 24, the output pitch pulse from block 24 operates the one-shots in blocks 58 and 59, which in turn produce a steady state backward biasing voltage across R11 for idling the shunting transistor Q5 by way of terminals *x* and *x*. The sharp rise in voltage across R11 also applies forward pulses to the one-shots in blocks 62 and 63, which operate and render the gating transistors Q25 and Q26 conductive, by way of the connecting terminals A to A, and B to B, respectively. The conductive transistor Q26 connects the capacitor C59 to the coil L3 for charging to the peak of the initial sound wave. The conductive transistor Q25 connects the charged capacitor C59 and C3 in series with the timing resistor R13, so that by the time the delayed sound wave arrives at the first gate electrode of Q1 the capacitor C3 will have charged to the same potential as of C59. At this point, the one-shot in block 63 has already returned to its normal state of operation, and the one-shot in block 62 just returns to its normal state of operation, thereby disconnecting the resistor R13 from C3, and at the same time operates the one-shot in block 64 which in turn renders the discharging transistor Q27 conductive, by way of terminals C, and C, for discharging the capacitor 59. Thus, the charged voltage across capacitor C3 is ready to modulate the amplitude of the initially arrived sound wave at the input terminal *a*. Of course, it is assumed that the capacitive value of C59 is much larger than the capacitive value of C3, so that the former will not lose appreciable amount of its charged value during transfer of charge to C3.

The initial output pitch signal from block 24 is also applied to the distributor in block 26, which assuming that initially energizes the output terminal 68, it operates the one-shot circuits in blocks 27 and 28, the latter of which renders Q7 conductive for charging the capacitor to the intial peak of the sound wave, while the former remains in operation until the delayed initial sound wave arrives at terminal *a*. By the time the initial sound wave arrives at terminal *a*, however, at least one more pitch signal will have occurred at the output of pitch selector in block 24 for operating the distributor 26 another step. Thus the short lived operation of the one-shot in block 30 will have rendered the transistor Q8 conductive, by way of the connecting terminals *r* and *r* for connecting and charging the capacitor C6 to the second major peak of the initial sound wave across secondary coil L3. Accordingly, at the instant that the capacitor C3 is disconnected from C59 in series with the resistor R13, the one-shot circuit in block 27 returns to its normal state of operation, and applies a pulse signal to the set-reset flip-flop in block 46, through the differentiating capacitor C23, to set position, the output of which applies forward biasing voltage to the gating transistor Q14 for conduction, which in turn connects the charged capacitor C6 to the capacitor C3 in series with the timing resistor RL1. During the energized time period at terminal 68 of the distributor in block 26, the stored quantity in block 40 changes the resistive value of RL1 in such proportion that the live end of the capacitor C3 will assume the same potential of C6 at the time that the second peak of the sound wave arrives at the terminal *a* of the amplifier transistor Q1. This procedure continues in the following steps of signal distribution, as the incoming sound waves continue yielding pitch pulse signals at the output of block 24. After each step of gain control of the amplifier, however, the preceding storages must be erased for repeat cycle of operation. For example, when the operating one-shot in block 29 returns sharply to its idle state, it operates the set-reset flip-flop in block 47 to set position, and at the same time sends a pulse signal to the preceding set-reset flip-flop in block 46 for reset operating position. The sharply changing state of the block 46 to reset position produces a pulse through the differentiating capacitor C35, and operates the discharger in block 52 for discharging the stored quantity in block 40. This very pulse signal is also applied through the differentiating capacitors C41 and C42 to the discharging transistors Q13 and Q14 in forward biasing polarities, by way of the connecting terminals *k* and *l*, for discharging the charged capacitors C5 and C6. Normally it would be required that only the succeeding capacitor C6 is discharged, but because at the initial sound wave the capacitor C3 is charged to the auxiliary capacitor C59, the charge of C5 is not utilized, and must be discharged simultaneously with C6, so as to avoid an erroneous gain change of the amplifier during succeeding steps of signal distribution, even though such an error will be of short duration to be noticeable in the normalized sound wave. Since the distributor is chosen of the ring type, without a fixed starting position, these double dischargings must be included in all the succeeding stages, for example, simultaneous discharges of C6, C7, and C7, C5, etc. These simultaneous discharges, however, can be reduced to discharges of only the succeeding capacitors, when the distributor in block 26 is arranged for a fixed starting position. In this case, the distributor must be driven to said fixed position after the sound wave has terminated, for example, by a pulse derived from across R11 or R12, when the steady state voltages across these resistors sharply drop to quiescence. With such an arrangement, the one-shots in blocks 62 through 67, the transistors Q26, Q27, Q29, Q30, and capacitors C53 through C60 are eliminated, and the voltages derived from the operating states of the one-shots in blocks 27 and 34 are applied in forward biasing directions to the transistors Q25 and Q28, respectively, for connecting the capacitors C3 and C4 to the capacitors C5 and C8, in series with the timing resistors R13 and R14, respectively. In either arrangement, the net result is the same, and its use is only a matter of choice.

In reference to the phase shifting network in block 23, it is herein preferred that the stepwise gradual variation of the amplifier gain starts at the zero (or near zero crossing) crossing of the sound wave arriving at the input terminals *a* and *b* of the amplifier. The phase shifting network in block 23 is then included in the drawing with the assumption that pitch detector is of the type for peak selection. There are other types of pitch detectors, however, for example, using pitch frequency tracking systems, which inherently may not need the phase shifting network in the block of 23. Then again, the required operation of the gain-controllable amplifier shown herein does not depend on this phase shift, and the said steps of gain shift may just as well start from the peaks of the sound waves, since the gain variation from train to train of the sound waves is gradual, and makes no difference where these starting points of the waves are. Thus, the phase shifting network in block 23 may be dispensed with, if so desired.

There are many known types of distributors in the art of electronics, for example, by flip-flop arrangement, and the gas or vacuum tube types that usually have ten segments of distributory anode electrodes. Accordingly, the type of distributory device used is only a matter of choice, with equal functional performance. Of course, the number of distribution stages is preferred to be sufficiently high for storage of all the distributory signals that may occur during the delay time period of the block 22 in FIG. 3, for example, if during said delay time period there occur ten pitch signals, as the highest that may occur, the distributor should have ten output terminals. Also, the one-shot circuits in block 27 through 39, 58 through 61, and 62 and 65, are shown only as timing devices, and timing devices in various forms are known, and accordingly, the term one-shot is used herein only for the reason that it is a commonly used term by the skilled in the art of electronics, and the choice of usage should therefore be broad. The one-shots in blocks 28, 30, 32, 35, 37, 39, 63, 64, 66 and 67 are shown in the drawing because they produce sharply defined output pulses. However, pulses produced by these one-shots are only to allow enough time for the desired charges and discharges of capacitors, and therefore, they may be substituted by coupling capacitors, for equally satisfactory performances. Further, the gating transistors used in FIG. 2 are shown of the insulated-gate field-effect type, as they possess source to drain zero offset operating characteristics. However, this is only a matter of choice, as satisfactory operation of the arrangement shown does not depend on cricitically accurate component parts. Similarly, there are shown two stages of amplifier gain control, the first comprising Q1 and Q2, and the second comprising Q3 and Q4. The number of stages, however, depends upon the magnitude of signal handling capabilities of these field-effect tetrode transistors. Since these types of transistors are new in the field of electronics and newer and improved ones are now appearing in the market, a single stage of gain-controlling amplifier may also yield the desired scale of amplitude equalization. The series connected resistors R9 and R10 are shown in the drawing for the purpose of eliminating the controllable resistive elements RL1 through RL6, and the associated signal quantity storing devices in blocks 40 through 45. In this case, the fixed values of the resistors R9 and R10 are preadjusted as an average time constant, instead of being variable in steps of the varying time periods of the trains of said sound waves. However, they may also be used as part of the resistive values of RL1 through RL6, if the chosen devices RL1 through RL6 are not capable of yielding the required range of resistance variation. These resistive elements may be in the forms of magnetically varying resistive elements; voltage varying resistive elements; or luminosity varying resistive elements, and the like.

Variably controllable devices are usually subject to environmental instability. Accordingly, it is sometimes preferable to use devices having incremental steps of fixed values, because fixed value devices usually have greater stability under severe environmental conditions. For example, instead of using a single controllable resistive element such as RL1, a plurality of fixed resistors in incremental resistive values may be substituted, and the one having the closest resistive value of the desired time constant with respect to the capacitor C3 may be selected during the proper time period for operation. This may be done by substituting; the time-versus-signal quantity storage device in block 40 through 45 by distributors operating at constant frequency distribution rate, for selecting one of a plurality of fixed value resistors which represents a close approximation of the time period during which it is selected. Such an arrangement is shown in FIG. 4.

In FIG. 4, the distributor in block 69 represents the same distributor in block 26 of FIG. 3. Similarly, the one-shot circuits in blocks 70 to 72 have operating time periods equal to the delay time period of the sound wave, and they represent the same one-shot circuits in blocks 27, 29 and 31, respectively, in FIG. 3. The blocks 76 to 78 represent normally idle gates each having first, second and third inputs, and an output, and are arranged to operate only when their first, second and third inputs are forward biased simultaneously. Such a gate may, for example, consist of three series connected transistors, whose gates are controlled individually. The idle operating states of the outputs of one-shots in block 73 to 75 are directly applied to the first inputs of gates 76 to 78, respectively, in forward biasing directions. The second inputs of these gates are normally biased in backward directions, but the energized output terminals of the distributor in block 69 apply direct forward biases to these respective second inputs. Finally, the output oscillations of the oscillator in block 79 (which may be a pulse generator at a predetermined frequency) are applied in parallel to the third inputs of the gates 76 to 78, so that any one of these gates receiving simultaneous forwarding biases upon its first and second inputs, the said oscillations applied to its third input are admitted to its output. The output of gate 76 is applied to the distributor in 80; the output of gate 77 is applied to the distributor in block 81; and the output of gate 78 is applied to the distributor in block 82. As indicated in the foregoing, the distributor in block 69 is of the ring distribution type. But the distributors 80 to 82 are of the reset types so that they will start distribution from a fixed starting point. The output terminals of distributors 80 to 82 are terminated to outgoing on-and-off transistors for selecting and series-connecting fixed resistors in different ohmic values, for example, the first output distribution terminal will select the resistor having the smallest ohmic values, and the last output terminal will select the resistor having the largest ohmic value. For simplicity of drawing, however, only two output terminals from each of the distributors are shown connecting to last said gate. For example, the two exemplary distributory output terminals of block 80 are applied to the on-and-off transistors Q31 and Q32, directly in forward biasing directions, for rendering one of these transistors conductive, and thereby selecting one of the series connected fixed resistors R1*a* and R1*b*, having an ohmic value representative of the time period during which a number of distributions have been made. Similarly, the two exemplary output terminals of distributor in block 81 are connected to the on-and-off transistors Q33 and Q34, for rendering one of these transistors in on-state, after the distribution of 81 has terminated, and thereby selecting one of the fixed value resistors R2*a* and R2*b*. Further, the two output terminals of the distributor in block 82 are connected to the on-and-off transistors Q35 and Q36, for rendering one of these transistors in on-state and selecting one of the series connected fixed value resistors R3*a* and R3*b*.

The source electrodes of transistors Q31 and Q32 are connected in parallel, and further connected to the drain electrode of the on-and-off transistor Q38. Similarly, the source electrodes of transistors Q33 and Q34 are connected in parallel, and further connected to the drain electrode of the on-and-off transistor Q37. Further, the source electrodes of transistors Q35 and Q36 are connected in parallel, and further connected to the drain electrode of the on-and-off transistors Q39. With these last given connections, the source electrode of Q37 is connected to the storage capacitor C6; the source electrode of Q38 is connected to the storage capacitor C7; and the source electrode of Q39 is connected to the storage capacitor C5. The on-and-off gating transistors Q37 to Q39 are then rendered in on-states sequentially, as in the following:

When the operating one-shot in block 71 returns to its idle state of operation, the pulse signal transmitted through coupling capacitor C61 alternates the operating state of the flip-flop in block 83 into reset position, and the pulse signal transmitted through the coupling capacitor C62 alternates the operating state of the flip-flop 84 into set position, thus rendering the transistor Q39 nonconductive, and the transistor Q37 conductive. Assuming at this time that the distribuor 80 had energized its output-terminal connecting to the gate electrode of transistor Q32, thereby rendering Q32 conductive, an electrical circuit is formed from capacitor C3 to the already charged capacitor C6 in series with the resistor R1*b*, for charging C3 to the voltage of C6. Since selection of the resistor R1*b* is effected by the second output terminal of the distributor 80, the ohmic value of R1*b* is then preselected to represent the second incremental value from minimum to maximum ohmic values, for the proper timing rate of charge of the capacitor C3. While only two resistors are shown for each distributory stage, it is to be understood, of course, that greater number of these resistors are to be used for finer increments of these ohmic values. Operation of the succeeding stages are simliar, for example, when the one-shot in block 72 returns to its idle state of operation, the pulse signal transmitted through coupling capacior C63 alternates the operating state of the flip-flop in block 84 into reset position, and the pulse signal transmitted through the coupling capacitor C64 alternates the operating state of the flip-flop 85 into set position, thus rendering the transistor Q37 non-conductive, and the transistor Q38 conductive, for connecting C3 to C7 in series with one of the resistors R2*a* or R2*b*. Further, when the one-shot in block 70 returns to its idle state of operation, the pulse signal transmitted through coupling capacitor C65 alternates the operating state of the flip-flop in block 85 into reset position, and the pulse signal transmitted through the coupling capacitor C66 alternates the operating state of the flip-flop 83 into set position, thus rendering the transistor Q38 nonconductive, and the transistor Q39 conductive, for connecting C3 to C5 in series with one of the resistors R3*a* or R3*b*.

In the above given conditions of successive operations, the distributors 80 to 82 must also be reset to their normal set positions, for continuous operation. For example, the output pulse transmitted through coupling capacitor C67 from block 70 resets the distributor 81 into set position; the pulse signal transmitted through coupling capacitor C68 from block 71 resets the distributor 82 into set position; and the pulse signal transmitted through coupling capacitor C69 from block 72 resets the distributor in block 80 into set position, for the said successive operation. The one-shot circuits in blocks 73 to 75 are used to reduce the number of output terminals of the distributors in blocks 80 to 82. For example, if the highest pitch frequency is 700 cycles per second, the starting time period of distribution may be delayed 4 milliseconds long, so that during this time period wasteful distribution is not performed, since the lowest ohmic value of the selected resistor in series with C3 will be to charge it during 4 milliseconds. Thus, when the one-shot in block 73 is operated, it applies a direct backward bias to the first input of the gate in block 76, rendering it inoperative until the one-shot 73 returns to normal idle state after 4 milliseconds, so that the distributor 80 starts distribution after 4 milliseconds have passed. Similarly, the one-shot in blocks 74 and 75 delay the starting time periods of the distributors 81 and 82, respectively, for 4 milliseconds. These delay circuits, however, may be dispensed with, if so desired, without affecting the required performance of the system presented herein.

As described in the foregoing, the pitch selector may be in any known form that may be suitable for the purpose herein, for example, the circuit arrangement as disclosed in my Patent No. 2,872,517, Feb. 3, 1959. The operation of this circuit may be described by way of the simple arrangement given in FIG. 5, wherein, the input sound signal is applied to the first gate electrode of the field-effect tetrode transistor Q37, across load resistor R13 which returns to the source electrode in series with a normal backward bias B2, the latter of which is adjusted to the nonlinear $G_m$ characteristics of the Q37. The second gate electrode is zero biased to the source electrode by the shunting resistor R14 in parallel with the capacitor C70. The amplified sound wave across resistor R15 in the drain circuit of Q37 is coupled through the coupling capacitor C71 to the load resistor R16, which returns to the source circuit of Q37 in series with a signal-limiting bias-voltage B3. This amplified voltage is also fed back in degenerative direction to the second gate electrode through the diode D7.

In operation, when the input sound wave is applied to the first gate of Q37, it is amplified across R15 and further applied to the load resistor R16 through coupling capacitor C71. Because of the bias voltage of B3, the diode D7 does not conduct until the amplified voltage is above the voltage of B3. But above this voltage, a degenerative feed-back is applied to the second gate electrode of Q37. During forward signal application to the first gate, the transconductance of Q37 increases, while at the same time the degeneratively rectified voltage applied to the second gate decreases the said transconductance. When the gain of Q37 is made normally high at the drain circuit resistor R15, the rate of decrease in transconductance can be made much larger than the said increase, by the application of forward biasing signal at the said first gate. Thus, when the input sound wave is in forward direction, the degeneration becomes so fast that the voltage across R14 falls in backward biasing direction with much sharper edge than the applied input signal, and this sharply defined voltage has the highest peak at the major peaks of the speech sound waves. Because of the parallel connected capacitor C70, the gain of Q37 remains at a low level by the charge across C70, which gradually discharges through R14. During this discharge, however, the gain of the amplifier is kept low enough to avoid feed back by the minor peaks between said major peaks, or at least, to keep the feed backs by the minor peaks at lower levels than the major peaks. By properly adjusting the gain of the amplifier across resistor R15, the feedback voltages of said major peaks can be kept at almost a constant voltage level, under wide amplitude variations of the original sound waves. Thus the major peaks of the speech sound waves, or other complex waves, can be selected by selecting only the highest feedback voltages. Then, by varying the bias voltage of B3, the major peak selection can be limited to above background noise accompanying the sound waves. And since the gain of the amplifier in FIG. 5 is raised above the said minimum gain only when said major peaks are selected, the background noise can then be kept at minimum at will.

With the preferred arrangements given in the foregoing, and with the indications that various other modifications, adaptations, and substitutions of parts can be made, without departing from the true spirit and scope of the invention, the scope of usefulness in practice as embraced by the invention will now be defined by the claims appended thereto.

What I claim is:

1. In a system for amplifying complex waves which comprise variably changing major amplitude peaks at varying repetition rates selectively distinguishable from minor peaks between said major peaks, the system for equalizing the amplitudes of said major peaks of the amplified waves to a common reference level, said system comprising: means for deriving from said waves pulses representative in repetition rate of said major peaks; a first time delay means for time delaying said complex waves; a gain controllable amplifier having a gain-controlling input and a signal input; means for applying said time delayed waves to the signal input of said amplifier; and apparatus for applying to said gain-controlling input control signals for equalizing the amplitude levels of said major peaks of said amplified waves to a common reference level, said apparatus comprising; a first capacitor storage means directly connected to said gain controlling input and normally containing sufficient charge to bias said amplifier to said reference level; a plurality of second capacitor storage means having substantially larger capacities than said first storage means; a plurality of normally idle first unidirectional coupling means for coupling said complex waves to said plurality of second storage means; a ring distributor means having distribution outputs and being responsive to said pulses for operating said plurality of first unidirectional coupling means thereby sequentially storing in sid plurality of second storage means, for the duration of the period of each of said major peaks, signal quantities representative of the amplitudes of said major peaks; a plurality of normally idle switching means for respectively connecting to said first storage means said plurality of second storage means; a plurality of second time delay means coupled between the outputs of said ring distributor and said plurality of switching means, respectively, each of said second delay means having substantially the same time delay as that of said first time delay means, for operating said plurality of switching means coincidentally with the major peaks of said time delayed complex waves, whereby connecting said first storage means to said plurality of second storage means to transfer the charges from said plurality of second storage means to said first storage means in distributory sequence, thereby changing the gain of said amplifier to effect said equalization.

2. The system as set forth in claim 1, wherein is included means for advancing the phase angle of said complex waves by approximately 90 degrees prior to said derivation of said pulses, so that said transfer of charges from said second plurality of storage means to said first storage means starts 90 degrees in advance of said major peaks of said amplified complex waves.

3. The system as set forth in claim 1, wherein is included with said apparatus a plurality of controllable resistive elements, each associated with one of said plurality of second capacitors, respectively; and means for controlling the ohmic values of said plurality of resistive elements such that the time constant formed by said element and its respective capacitor equals the time period between said major peaks of the delayed amplified waves, whereby establishing gradual but complete transfers of said storage charges.

4. The system as set forth in claim 1, wherein said plurality of switching means connecting said plurality of second capacitors to said first capacitor comprises plurality of normally idle field-effect transistors.

5. The system as set forth in claim 1, wherein is included means for shifting the gain of said amplifier to said reference level from a preceding gain-adjusted level, when the time period between any of said major peaks of said complex waves exceeds a reference time period equal to or longer than the longest time period that may occur between two major peaks, whereby, during the absence of said complex waves, releasing the gain of said amplifier from a preceding hold that may have a different level than said reference level.

6. The system as set forth in claim 1, wherein is included with the said apparatus an auxiliary storage capacitor means having substantially larger capacity than said first capacitor storage means; means for storing in the said auxiliary storage means a signal quantity representative of the amplitude of the initial wave peak of the said complex wave arriving at said first time delay means; a resistor; a normally idle gating means in series with said first capacitor storage means, said resistor, and said auxiliary capacitor means; means for operating said gating means prior to the arrival of the initial wave peak of said time delayed complex waves to said amplifier, whereby to transfer the charge of the auxiliary storage means to the said first capacitor storage means in series with said resistor, as an initial gain adjustment of said amplifier; and means for rendering said gating means in idle state, and discharging said auxiliary storage means at the arrival of said initial wave peak of the said complex wave to said amplifier, whereby to start normal gain controlling operation of said amplifier.

7. The system as set forth in claim 1, wherein said plurality of switching means comprise groups of switching means in series with groups of resistor elements, the ohmic values of each of the groups of resistor elements having been prearranged incrementally in time constant proportions with respect to the said plurality of capacitor storage means; an oscillator; a plurality of AND gates, each having first and second inputs and an output; coupling means from the outputs of said ring distributor means to the first inputs of said plurality of AND gates, respectively, and parallel coupling means from said oscillator to the second inputs of said gates, whereby operating said gates only when their first and second inputs are activated simultaneously; and a plurality of auxiliary distributors responsive to the outputs of said plurality of AND gates, respectively, but said distributors having groups of distributing outputs for operating said plurality of groups of switching means, respectively, for selecting for the duration between one output to another of said ring distributor one of said resistor elements from a group of said plurality of resistor elements so that gradual but complete transfers of said storage charges may be established.

8. In an amplifying system for equalizing the amplitude variations of major amplitude peaks of complex speech waves, in which said variations change substantially exponentially, the system of equalizing the amplitudes of said waves in exponential variations whereby eliminating wave distortion of the original complex wave, said system comprising: means for deriving pulse signals from said waves representative of the repetition rate of said major amplitude peaks; a gain controllable amplifier having a signal input and a gain controlling input; means for time-delaying said waves and applying said time-delayed waves to said signal input of said amplifier, and appartus for applying to said gain controlling input a control signal for equalizing the amplitude levels of said major peaks of said amplified waves exponentially to a common reference level, said apparatus comprising; a first capacitor directly connected to said gain controlling input and normally containing sufficient charge to bias said amplifier to said reference level; a plurality of second capacitors having substantially larger capacities than said first capacitor; a ring distributor and a plurality of unidirectional coupling means for applying said waves distributively to said plurality of second capacitors for storing, for the duration of the period of each of said major peaks, signal quantities representative of the amplitudes of said major peaks; a plurality of controllable resistors selectably operable under the control of said ring distributor, during the successive periods between each of said major peaks, for changing their ohmic values in time constant proportions with respect to the said plurality of capacitors to equal the time periods between respective said major peaks of the said delayed-amplified waves; a plurality of said second time delay means responsive to said ring distributor, each of last said delay means having time delay equal to that of the said first time delay means; and a plurality of switching means responsive to said plurality of second delay means, for connecting said first capacitor to said plurailty of second capacitors in series with said plurality of controllable resistors, to selectively transfer charges from said plurality of second capacitors to said first capacitor in delayed coincidental time periods with respect to the delayed and amplified waves, whereby the transferred charges across the said first capacitor control the gain of the said amplifier with exponential variations in opposition to the original exponential variations, and thereby attaining the nondistortioned amplitude equalization.

References Cited

UNITED STATES PATENTS

| | | | |
|---|---|---|---|
| 2,958,047 | 10/1960 | Kalfaian | 330—144 |
| 3,094,586 | 6/1963 | Dersch | 179—1 |
| 3,308,392 | 3/1967 | McCatver | 330—144 |

KATHLEEN H. CLAFFY, *Primary Examiner.*

ROBERT P. TAYLOR, *Assistant Examiner.*

U.S. Cl. X.R.

324—77